Patented May 26, 1931

1,806,671

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

SUBSTITUTED ARYL ANTIOXIDANT

No Drawing.    Application filed October 20, 1928. Serial No. 313,972.

This invention relates to processes of, and compounds for retarding or preventing the oxidation of organic substances, and compositions containing the retardants. Such antioxidants have many uses in various industrial and commercial fields, such as for the preservation of oxidizable organic compounds and, more particularly, for arresting deterioration of rubber compositions.

I have discovered that a series of compounds comprising certain substituted aryl compounds have antioxidant properties which make them useful for the above purposes. These compounds have three of the hydrogen atoms of the benzene ring replaced by various substituents, one of which is an hydroxy group, another being an hydroxy or amino group, and the third of which may be a halogen, an alkyl or a carboxyl group. These compounds may also be considered as aryl hydroxy compounds containing two additional substituents in the ring.

More specifically among the compounds falling within the class described may be mentioned 4-chlor-2-amino phenol, chlor-hydroquinone, P-amino-M-cresol, amino salicylic acid, etc. All of these substances as well as others of the same type may be used successfully to retard or entirely prevent deterioration of organic compounds, such as rubber, due to oxidation.

The antioxidants described may be prepared according to any well known chemical processes of condensation or other treatment of organic compounds to obtain the desired end products. The invention, of course, is not limited to any specific method of preparing the various antioxidant compounds.

To illustrate the effectiveness of these antioxidants, a series of tests were carried out in which standard vulcanizable rubber mixtures were made up, each mixture containing about 1% of one of the autioxidants. Each mixture was formed into sheets and these sheets were vulcanized at 281° F. for thirty minutes. After vulcanization the sheets were cut up into test dumb-bells and break tests were carried out on one or more of the test pieces containing the various antioxidants. Others of the test pieces were placed in an oxygen bomb which was maintained at a temperature of 70° C. for a period of three days under an oxygen pressure of three hundred pounds per square inch. After this oxygen treatment the treated dumb-bells were also submitted to the break tests. The treatment in the oxygen bomb was used to simulate aging and to permit rapid determination of the effect of oxygen upon the rubber compositions, the results obtained corresponding approximately to what might be expected to take place in a much longer period of time in ordinary use of the rubber composition.

To serve as a check and standard of comparison, a rubber composition exactly similar to those described was made up and vulcanized under the same conditions, the rubber mixture in this case, however, containing no antioxidant. When this rubber mixture was tested in the oxygen bomb, it deteriorated completely after the described accelerated oxidation test. The following table illustrates the effectiveness of the presence of a small amount of antitoxidant in the rubber compositions, as compared with a rubber sample containing no antioxidant.

|  | Tension at break lbs. sq. in. | |
|---|---|---|
|  | Before aging | After aging |
| Rubber compound without antioxidant | 2600 | Deterioration |
| Rubber compound with 1% 4-chlor-2-amino phenol | 2735 | 1645 |
| Rubber compound with 1% 4-chlor-hydroquinone | 2300 | 1745 |
| Rubber compound with 1% P-amino-M-cresol | 2775 | 1975 |
| Rubber compound with 1% amino-salicylic acid | 2675 | 1545 |

It is obvious that many other substances falling within the general classification described may be used as antioxidants with effects more or less similar to those set forth. Any suitable and desired changes may be made in proportions, compounds used, conditions of operation or other details without departing from the spirit and scope of the invention except as set forth in the appended claims.

I claim:

1. A rubber composition containing P-amino-M-cresol.

2. The process of retarding oxidation of an oxidizable organic compound which comprises mixing therewith P-amino-M-cresol.

3. The process of retarding oxidation of a rubber composition which comprises mixing therewith P-amino-M-cresol.

In testimony whereof, I have hereunto subscribed my name this 16 day of October, 1928.

LUDWIG J. CHRISTMANN.